United States Patent [19]

Soma et al.

[11] 4,370,517

[45] Jan. 25, 1983

[54] POLYOLEFIN COMPOSITIONS FOR ELECTRICAL INSULATION

[75] Inventors: Kenichiro Soma; Shoji Kuma; Harunori Sakaguchi; Hisanari Shirai; Ryoichi Ito; Toshio Shiina, all of Ibaraki, Japan

[73] Assignee: Hitachi Cable Limited, Tokyo, Japan

[21] Appl. No.: 217,926

[22] Filed: Dec. 18, 1980

Related U.S. Application Data

[63] Continuation of Ser. No. 974,271, Dec. 28, 1978, abandoned.

[30] Foreign Application Priority Data

Dec. 29, 1977 [JP] Japan .................. 52-159423
Dec. 6, 1978 [JP] Japan .................. 53-151268

[51] Int. Cl.³ .................. H02G 15/02; D03D 13/00
[52] U.S. Cl. .................. 174/74 A; 174/84 R; 174/110 R; 174/110 PM; 428/522; 428/377
[58] Field of Search .................. 252/570; 174/110 SR, 174/110 B, 110 PM, 110 V, 120 C, 120 SR; 427/111; 428/463, 379

[56] References Cited

U.S. PATENT DOCUMENTS

| 3,211,808 | 10/1965 | Young et al. .................. 260/876 |
| 3,719,769 | 3/1973 | Miyauchi et al. .................. 174/120 SC |
| 3,769,085 | 10/1973 | Matsubara .................. 174/120 SC |
| 3,808,047 | 4/1974 | McAda .................. 428/379 |
| 3,819,410 | 6/1974 | Kukro et al. .................. 428/379 |
| 3,840,694 | 10/1974 | Luczak .................. 174/120 SR |
| 3,855,508 | 12/1974 | Ross et al. .................. 317/259 |
| 4,042,776 | 8/1977 | Matsuba et al. .................. 117/110 R |
| 4,092,488 | 5/1978 | Hayami et al. .................. 174/84 R |
| 4,255,303 | 3/1981 | Keogh .................. 260/23 H |

FOREIGN PATENT DOCUMENTS 2709139 9/1978 Fed. Rep. of Germany .
51-12684 1/1976 Japan .
51-17588 2/1976 Japan .
51-20706 6/1976 Japan .
51-20707 6/1976 Japan .

Primary Examiner—P. E. Willis, Jr.
Attorney, Agent, or Firm—Sughrue, Mion, Zinn, Macpeak & Seas

[57] ABSTRACT

A polyolefin insulated electric cable exhibiting the effect of suppressed water tree formation which comprises an electrical insulation layer comprising a polyolefin containing about 0.01 to 13.0% by weight ester groups provided around a conductor.

10 Claims, 7 Drawing Figures

POLYOLEFIN COMPOSITIONS FOR ELECTRICAL INSULATION

This is a continuation of application Ser. No. 974,271, filed Dec. 28, 1978, now abandoned.

BACKGROUND OF THE INVENTION

1. Field of Invention

The present invention relates to polyolefin compositions and particularly to an improvement in polyolefin compositions used under water. More specifically, it relates to polyolefin compositions in which electrical deterioration under water is reduced and to electric cables, connectors and terminals and sheets made from such compositions.

2. Discussion of the Prior Art

Electrical hardware such as electric cables, etc. are often used immersed in water. In such cases, the electrical insulators in the hardware are deteriorated in water. It has been generally known that this deterioration is markedly accelerated when an electrical field is applied to the electrical insulators. It has been found that this deterioration is due to the generation of the so-called water tree. Accordingly, in order to stabilize the operation of this hardware, it is necessary to suppress the generation of water trees in the insulator of electrical machinery such as cables, etc.

The water tree phenomenon is essentially based on a behavior of energetic stabilization by increasing the dielectric constant of a charging space. The water trees generated from a water electrode or a water-containing semiconductive electrode are caused as water, having a high dielectric constant, permeates into the polymeric insulator by the Maxwell force. Further, water trees formed around a void or an impurity in the insulator (so-called "bow tie trees"), water vapor in the polymer condenses and pushes away the polymer chains under electrical charging to thereby mechanically warp the polymer surrounding it. Consequently, the polymer creeps and microcrystals come loose, by which water is scattered from an orifice formed on the void wall.

SUMMARY OF THE INVENTION

From an understanding of the mechanism of water tree generation it has been found that it is possible to suppress the generation of water trees by preventing the local stress and the creep phenomenon generated by the condensation of water in the polymer insulator. Thus, it has been found that various sources of ester groups are useful not only for relieving the strain in the polymer crystals but also for removing the strain caused by the condensation of water in the polymer by changing the hydrophobic property into a hydrophilic property.

The present invention has been accomplished on the basis of the above described understanding and recognition.

A principal object of the present invention is to provide a polyolefin composition for electrical insulators, in which the generation of water trees, particularly, the so-called bow ties trees caused by voids or contaminants in the insulator is markedly reduced and prevented.

A principal object of the present invention, therefore, is to suppress the formation of water trees by incorporating into the insulator surrounding an electrical conductor a specified ester group content.

Another object of the present invention is to provide an electric cable which is resistant to aging under water.

These and other objects are accomplished in accordance with the present invention which comprises a polyolefin composition for electrical insulation containing 0.01–13.0% by weight of ester groups.

DETAILED DESCRIPTION OF THE INVENTION

Figure 2:
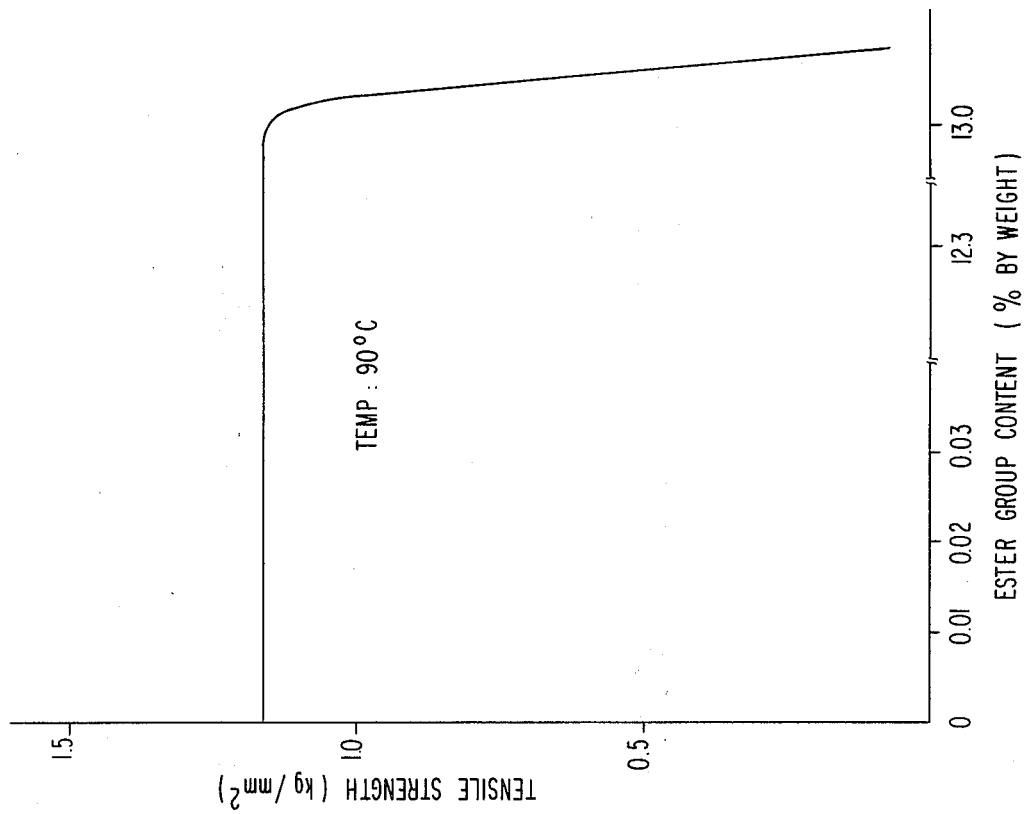
FIG. 2 is a graph showing the relationship between tensile strength at a high temperature and the ester group content.

As the polyolefin which is the base resin of the composition underlying the present invention, there is polyethylene, ethylene-vinyl acetate copolymer, ethylene-ethyl acrylate copolymer, ethylene-methyl acrylate copolymer, ethylene-ethyl methacrylate copolymer, ionomer, ethylene-acrylic acid copolymer, ethylene-propylene copolymer, ethylene-butene-1 copolymer, ethylene-N-vinyl-carbazole copolymer, ethylene-vinyl acetate-vinyl chloride graft terpolymer, polyethylene-butyl rubber graft polymer, polypropylene, etc. The insulative polyolefin composition which characterizes the present invention has an ester group content of about 0.01 to 13.0 wt. %. (Throughout this specification the term "ester group" includes the metal salt of a fatty acid which like a true ester contains a COO- group.)

The basis for the ester group content in the present invention is as follows: When the ester group content is below the above described range, the water tree suppression effect is reduced by half, and when it is above the above described range the desired physical and mechanical characteristics are not satisfied and the water tree suppression effect is not increased.

Various sources of ester groups can be used to achieve the critical content in accordance with the present invention. Namely, salts or esters of fatty acids can be incorporated into the polyolefin either in solid form or as a solution in a manner discussed below. As the fatty acid, stearic acid, sebacate acid or adipate acid can be used, but those of ordinary skill in this art will find that any fatty acid and preferably those having from 6 to 31 carbon atoms are suitable, the essential point being the presence of the ester group itself in the polyolefin composition. Examples of suitable fatty acid salts are cadmium stearate, lead stearate, zinc stearate, and lithium stearate. Suitable esters are esters of the above fatty acids and a polyol or glycol. Preferred polyols contain 5 to 6 carbon atoms. The glycol, e.g., polyethylene glycol may contain 2 to 46 carbon atoms. Specific examples of the esters include polyethylene glycol distearate, polypropylene adipate, polypropylene sebacate, stearic acid monoglyceride, sorbitan trioleate, sorbitan tristearate, polyoxyethylene sorbitan tristearate, etc.

Alternatively, the ester group can be introduced directly into the polyolefin polymer chain through the use of a predominantly polyolefin based copolymer containing as a comonomer a monomer containing an ester group. For example, ethylene-vinyl acetate copolymer (hereafter EVA), ethylene-ethyl acrylate copolymer (hereafter EEA), ethylene-methyl acrylate copolymer (hereafter EMA), ethylene-methyl methacrylate copolymer and mixtures of each of them with a polyolefin can be used in the present invention. Ethylene copolymers containing ester groups used in this invention include ethylene vinyl acetate-vinyl alcohol copolymer and ethylene vinyl acetate-acrylate ester copolymer in addition to EVA, EEA and EMA. The optimum range for the melt index (MI) is about 0.1 to 50. Preferably the melt index of these polymers is not less than the lowest value in the above described range because the polymer becomes difficult to mold and extrude. Further, preferably the melt index is not higher than the maximum value because the required physical and mechanical characteristics are not satisfied.

The above copolymers can be used alone as shown in Example 3 or mixed with a polyolefin such as polyethylene as shown in Example 4. In either case the amount of the comonomer containing the ester group of the amount of the copolymer in the composition is adjusted to provide an ester group content of 0.01 to 13.0% by weight.

In another embodiment of the present invention the polyolefin in the composition is grafted with a polyfunctional monomer containing an ester group. Examples of such polyfunctional monomers are described below and in many instances are the condensation product of a polyol and an acid containing an unsaturated bond which can be grafted to the polyolefin chain. Examples of unsaturated fatty acids which form a polyfunctional monomer are acrylic acid, crotonic acid, isocrotonic acid, undecylenic acid, propiolic acid and the like. Examples of polyol and glycol which can be condensed with the foregoing acids to prepare the monomer are ethylene glycol, diethylene glycol, triethylene glycol, polyethylene glycol having 6 to 46 carbon atoms, 1,3-butylene glycol, 1,4-butylene glycol, neopentyl glycol, dipropylene glycol, polypropylene glycol, tetramethylol methane, trimethylol ethane, trimethylol propane and the like.

Examples of such polyfunctional monomers include methoxy-polyethylene glycol methacrylate, polyethylene glycol dimethacrylate, neopentyl glycol dimethacrylate, trimethylolpropane trimethacrylate, polyethylene glycol diacrylate, tetramethylolmethane tetramethacrylate, and triallyl trimellitate.

Figure 3:
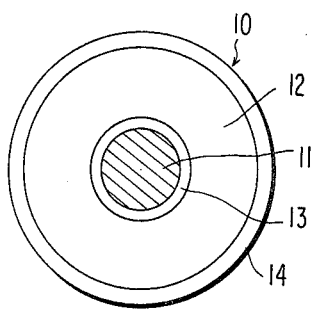
FIG. 3 is a cross-sectional view of an electric cable according to the present invention, wherein 11 is a conductor and 12 is an insulation layer comprising a cross-linked polyolefin composition containing ester groups.

An example of the cross-linked polyolefin insulating electric cables according to the present invention is shown in the accompanying FIG. 3. The cable 10 shown in the drawing is composed of a conductor 11 which is covered with an electrically insulation layer 12 comprising a cross-linked polyolefin composition which contains ester groups by which generation of water trees is prevented. 13 is an inner semiconductive layer and 14 is an outer semiconductive layer.

Numerous means are available to introduce ester groups into the polyolefin composition in accordance with the present invention. Ester groups can be introduced by admixing an ester or metal salt of a fatty acid or an ethylene copolymer containing ester groups with the polyolefin blending the mixture and molding, as shown in Examples 1 and 4. They can also be introduced by impregnating the molded polyolefin compositions with a liquid (or gaseous) ester, as shown in Example 2. As the liquid esters, esters which are liquid themselves and solid esters dissolved in a solvent may be used. On the other hand an ethylene copolymer containing ester groups in the polymer chain can be used alone and simply molded as shown in Example 3.

Also, ester groups can be introduced by adding an ester type polyfunctional monomer to the polyolefin composition and grafting the monomer to the polyolefin during molding of the composition, as shown in Example 5. Alternatively grafting polyolefin with an ester type polyfunctional monomer may be carried out and followed by carrying out preparation of the composition and molding.

A technique which comprises introducing an ester type polyfunctional monomer into the previously prepared polyolefin composition and molding the composition can also be used.

The present invention includes, as examples, polyolefin compositions which are not subjected to cross-linking treatment as well, examples of which show, of course, the desired effect of suppressing the water tree.

The compositions of the present invention contain cross-linking agents such as organic peroxide and antioxidants. Cross-linking agents and antioxidants used in this invention are not limited and any conventional cross-linking agents and antioxidants can be used. An especially suitable cross-linking agent is an organic peroxide such as dicumyl peroxide. The compositions may contain other ingredients or additives. For example, there are fillers, coloring agents, antiseptics, processing assistants (for example, lubricants or mold releasing agents) and pigments, etc.

The polyolefin compositions of the present invention may be used as plane materials such as tapes or sheets, etc. in the formation of connecting parts for cables, the formation of terminal parts for cables, and the formation of connecting parts for cables or wires to electrical machinery.

Figure 6:
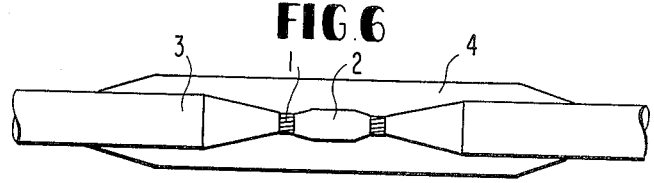
FIG. 6 is a cross-sectional view showing a connection portion of the cable according to the present invention.

FIG. 6 shows the connecting portion, wherein 1 is a conductor, 2 is a connecting sleeve, 3 is the insulating layer of the cable and 4 is an insulating layer forming the connecting portion comprising the olefin composition of the present invention. The insulating layer of the connecting portion may be provided by extrusion covering the olefin composition or by winding a tape or sheet of the olefin composition around the cables.

Figure 7:
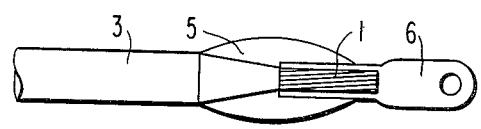
FIG. 7 is a cross-sectional view showing a cable terminal portion according to the present invention.

FIG. 7 shows a terminal in accordance with the present invention, wherein 1 is the conductor of the cable, 6 is a terminal connected with the conductor 1, 3 is an insulating layer of the cable and 5 is an insulating layer of the terminal part comprising the polyolefin composition of the present invention.

In summary, the essential aspect of the present invention, namely, the introduction of ester groups, is of course effective for suppressing the water tree, even if it is applied to other organic insulating materials other than polyolefins, for example, rubbers such as butyl rubber or silicone rubber, etc., chlorine containing resins such as vinyl chloride resin, fluorine containing resins such as tetrafluoro resin, or thermosetting resins such as epoxy resin or polyester resin, etc.

The present invention will become more clear from the following examples, each of which is directed to a different introduction of the ester group into the polyolefin.

EXAMPLE 1

Sheet samples having the composition shown in Table 1 were produced, which were examined by an electrical ageing test under water.

TABLE 1

| Sample No. | Poly- ethylene (parts) | Anti- oxidant (NOCRAC 300) (parts) | Dicumyl Peroxide (parts) | Salt or Solid Ester of Fatty Acid (parts added) | Ester Group Content[1] (wt. %) |
|---|---|---|---|---|---|
| 1 | 100 | 0.25 | 2.5 | None | 0 |
| 2 | 100 | 0.25 | 2.5 | Cadmium stearate (0.2) | 0.025 |
| 3 | 100 | 0.25 | 2.5 | Lead stearate (0.2) | 0.021 |
| 4 | 100 | 0.25 | 2.5 | Zinc stearate (0.2) | 0.027 |
| 5 | 100 | 0.25 | 2.5 | Lithium stearate (0.2) | 0.029 |
| 6 | 100 | 0.25 | 2.5 | Polyethylene glycol distearate (0.2) | 0.017 |
| 7 | 100 | 0.25 | 2.5 | Polypropylene adipate (0.2) | 0.085 |
| 8 | 100 | 0.25 | 2.5 | Polypropylene sebacate (0.2) | 0.074 |
| 9 | 100 | 0.25 | 2.5 | Stearic acid monoglyceride (0.2) | 0.0266 |
| 10 | 100 | 0.25 | 2.5 | Cadmium stearate (0.05) | 0.006 |
| 11 | 100 | 0.25 | 2.5 | Stearic acid monoglyceride (0.05) | 0.007 |
| 12 | 100 | 0.25 | 2.5 | Stearic acid monoglyceride (0.1) | 0.018 |

(Note)
[1] Ester group content contained in polyethylene to which metal salt or ester of fatty acid was added (% by weight).

Each sheet samples was 1 mm thick, 100 mm wide and 100 mm long. The voltage used for the test was 12 KV, 6 KV or 3 KV at 50 Hz AC. The aged time was 10,000 hours.

The results of the electrical ageing test under water for the above-described sheet samples are shown in Table 2.

TABLE 2

Result of electrical ageing test under water for samples to which metal salt or ester of fatty acid was added.

| Sample No. | Number of Water Trees Generated (number/cm$^3$) | | |
|---|---|---|---|
| | 3 KV | 6 KV | 12 KV |
| 1 | $1.0 \times 10^4$–$1.5 \times 10^4$ | $1.0 \times 10^5$–$1.4 \times 10^5$ | $1 \times 10^7$–$2 \times 10^7$ |
| 2 | 0.7 | 6.5 | 75 |
| 3 | 0.9 | 6.8 | 84 |
| 4 | 0.9 | 7.2 | 83 |
| 5 | 0.8 | 6.9 | 91 |
| 6 | 0.8 | 7.0 | 80 |
| 7 | 0.7 | 8.1 | 78 |
| 8 | 0.8 | 6.8 | 90 |
| 9 | 0.9 | 7.0 | 68 |
| 10 | $1.05 \times 10^3$ | $3.8 \times 10^3$ | $7.5 \times 10^4$ |
| 11 | $1.1 \times 10^2$ | $9.4 \times 10^2$ | $7.6 \times 10^3$ |
| 12 | 0.88 | 8.2 | 95 |

It can be seen from Table 2, that for Samples 2–9 and containing an ester group content 0.01% by weight or more, the number of water trees generated is remarkably reduced in comparison to the case of Sample 1 to which the metal salt or ester of the fatty acid was not added and Samples 10 and 11 containing less than 0.01% by weight of the ester group content.

EXAMPLE 2

Sheet samples having the composition shown in Table 3 were produced by impregnating polyethylene with liquid esters or solutions of the esters shown in Table 3 and examined by an electrical ageing test under water.

TABLE 3

| Sample No. | Polyethylene (parts) | NOCRAC 300 (parts) | Dicumyl Peroxide (parts) | Liquid Ester (impregnating time) | Ester Group Content[2] (wt. %) |
|---|---|---|---|---|---|
| 1 | 100 | 0.25 | 2.5 | No impregnation | 0 |
| 13 | 100 | 0.25 | 2.5 | Stearic acid monoglyceride (5 minutes) | 0.020 |
| 14 | 100 | 0.25 | 2.5 | Polyethylene glycol distearate (5 minutes) | 0.010 |
| 15 | 100 | 0.25 | 2.5 | Sorbitan trioleate (5 minutes) | 0.024 |
| 16 | 100 | 0.25 | 2.5 | Sorbitan tristearate (5 minutes) | 0.021 |
| 17 | 100 | 0.25 | 2.5 | Polypropylene adipate (5 minutes) | 0.032 |
| 18 | 100 | 0.25 | 2.5 | Polypropylene sebacate (5 minutes) | 0.015 |
| 19 | 100 | 0.25 | 2.5 | Polyoxyethylene sorbitan tristearate (5 minutes) | 0.028 |
| 20 | 100 | 0.25 | 2.5 | Polypropylene sebacate | 0.008 |

TABLE 3-continued

| Sample No. | Composition | | | | |
|---|---|---|---|---|---|
| | Poly-ethylene (parts) | NOCRAC 300 (parts) | Dicumyl Peroxide (parts) | Liquid Ester (impregnating time) | Ester Group Content[2] (wt. %) |
| 21 | 100 | 0.25 | 2.5 | (2 minutes) Stearic acid mono-glyceride (2 minutes) | 0.007 |

(Note)
[2]Ester group content included in polyethylene which was impregnated with liquid ester (% by weight)

Each sheet sample was 1 mm thick, 100 mm wide and 100 mm long. The voltage used for the test was 12 KV, 6 KV or 3 KV at 50 Hz AC. The aged time was 10,000 hours.

Results of the elctrical ageing test under water for the above described sheet samples are shown in Table 4.

TABLE 4

Result of electrical ageing test under water for samples which were impregnated with liquid esters.

| Sample No. | Number of Water Trees Generated (number/cm$^3$) | | |
|---|---|---|---|
| | 3 KV | 6 KV | 12 KV |
| 1 | $1 \times 10^4$–$1.5 \times 10^4$ | $1 \times 10^5$–$1.4 \times 10^5$ | $1 \times 10^7$–$2 \times 10^7$ |
| 13 | 0.95 | 7 | 70 |
| 14 | 0.95 | 8 | 90 |
| 15 | 0.83 | 9 | 88 |
| 16 | 0.96 | 8 | 86 |
| 17 | 1.0 | 6.6 | 68 |
| 18 | 0.9 | 7.5 | 73 |
| 19 | 0.95 | 7 | 68 |
| 20 | $2.0 \times 10$ | $1.7 \times 10^2$ | $1.9 \times 10^3$ |
| 21 | $1.2 \times 10^2$ | $9.8 \times 10^2$ | $7.8 \times 10^3$ |

As can be understood from Table 4, for Samples 13–19 containing an ester group content of 0.01% by weight or more, the number of water trees generated was remarkably reduced in comparison with Sample 1 which was not impregnated with the liquid ester and Samples 20 and 21 containing less than 0.01% by weight ester group content.

EXAMPLE 3

Using ethylene copolymers having ester groups, sheet samples containing the composition shown in Table 5 were produced and examined by the electrical ageing test.

TABLE 5

| Sample No. | Formulation | | | |
|---|---|---|---|---|
| | Copolymer (MI) | NOCRAC[3] 300 (parts) | Dicumyl[3] Peroxide (parts) | Ester[4] Group Content (wt. %) |
| 1 | Polyethylene | 0.25 | 2.5 | 0 |
| 22 | EVA (2.0) | 0.25 | 2.5 | 0.0077 |
| 23 | EVA (1.0) | 0.25 | 2.5 | 1.79 |
| 24 | EVA (7.5) | 0.25 | 2.5 | 3.07 |
| 25 | EVA (0.8) | 0.25 | 2.5 | 0.051 |
| 26 | EVA (2) | 0.25 | 2.5 | 0.51 |
| 27 | EVA (3) | 0.25 | 2.5 | 1.02 |
| 28 | EVA (2) | 0.25 | 2.5 | 12.79 |
| 29 | EVA (15) | 0.25 | 2.5 | 9.72 |
| 30 | EVA (6) | 0.25 | 2.5 | 17.91 |
| 31 | EEA (2.5) | 0.25 | 2.5 | 1.444 |
| 32 | EEA (2) | 0.25 | 2.5 | 0.0086 |
| 33 | EEA (2) | 0.25 | 2.5 | 0.05 |
| 34 | EEA (3) | 0.25 | 2.5 | 1.2 |
| 35 | EEA (6) | 0.25 | 2.5 | 8.666 |
| 36 | EEA (8) | 0.25 | 2.5 | 12.03 |
| 37 | EEA (3) | 0.25 | 2.5 | 16.85 |
| 38 | EMA (2) | 0.25 | 2.5 | 1.718 |
| 39 | EMA (1) | 0.25 | 2.5 | 0.0086 |
| 40 | EMA (2.5) | 0.25 | 2.5 | 11.45 |
| 41 | EMA (3) | 0.25 | 2.5 | 3.435 |
| 42 | EMA (2) | 0.25 | 2.5 | 0.057 |
| 43 | EMA (3) | 0.25 | 2.5 | 1.15 |
| 44 | EMA (6) | 0.25 | 2.5 | 17.2 |

(Note)
[3]Part by weight based on 100 parts of polyethylene.
[4]Ester group content included in the ethylene copolymer.

Each sheet sample was 1 mm thick, 100 mm wide and 100 mm long. The voltage used for the test was 12 KV, 6 KV or 3 KV, at 50 Hz AC. The aged time was 10,000 hours.

Results of the electrical ageing test under water for the above-described sample sheets are shown in Table 6.

TABLE 6

Result of electrical ageing test under water for ethylene copolymer samples containing ester groups.

| Sample No. | Number of Water Trees Generated (number/cm$^3$) | | |
|---|---|---|---|
| | 3 KV | 6 KV | 12 KV |
| 1 | $1.0 \times 10^4$–$1.5 \times 10^4$ | $1.0 \times 10^5$–$1.4 \times 10^5$ | $1 \times 10^7$–$2 \times 10^7$ |
| 22 | $1.0 \times 10^2$ | $9.5 \times 10^2$ | $7.0 \times 10^3$ |
| 23 | 0.8 | 6.8 | 65 |
| 24 | 0.9 | 7.0 | 88 |
| 25 | 0.7 | 7.0 | 89 |
| 26 | 0.9 | 6.8 | 73 |
| 27 | 0.85 | 9.0 | 84 |
| 28 | 0.87 | 9.8 | 91 |
| 29 | 0.84 | 9.5 | 88 |
| 30 | 0.86 | 8.6 | 89 |
| 31 | 0.8 | 8.3 | 90 |
| 32 | $1.1 \times 10^2$ | $9.0 \times 10^2$ | $6.8 \times 10^3$ |
| 33 | 0.75 | 7.5 | 78 |
| 34 | 0.95 | 7.6 | 76 |
| 35 | 0.91 | 7.3 | 78 |
| 36 | 0.87 | 5.6 | 60 |
| 37 | 0.84 | 8.3 | 88 |
| 38 | 0.9 | 8.4 | 92 |
| 39 | $1.2 \times 10^2$ | $9.0 \times 10^2$ | $6.7 \times 10^3$ |
| 40 | 0.88 | 7.8 | 68 |
| 41 | 0.88 | 8.1 | 73 |
| 41 | 0.71 | 9.2 | 72 |
| 43 | 0.92 | 8.3 | 88 |
| 44 | 0.88 | 5.2 | 58 |

As can be seen from Table 6, in Samples 23–31, 33–38 and 40–44 containing an ester group content of 0.01% by weight or more, the number of water trees generated was remarkably reduced in comparison with Sample 1 which did not contain ester groups and Samples 22, 32 and 39 containing less than 0.01% by weight of the ester group content.

EXAMPLE 4

Sheet samples having the composition shown in Table 7 were produced by mixing an ethylene copolymer containing ester groups and polyethylene, which were examined by the electrical ageing test.

TABLE 7

| Sample No. | Poly-ethylene (parts) | Ethylene Copolymer Having Ester Groups | | (parts) | NOCRAC 300 (parts) | Dicumyl Peroxide (parts) | Ester[5] Group Content (wt. %) |
|---|---|---|---|---|---|---|---|
| | | | (MI) | | | | |
| 1 | 100 | | | 0 | 0.25 | 2.5 | 0 |
| 45 | 99.9 | EVA | (2) | 0.1 | 0.25 | 2.5 | 0.012 |
| 46 | 98 | EVA | (2) | 2 | 0.25 | 2.5 | 0.256 |
| 47 | 99.95 | EVA | (2) | 0.05 | 0.25 | 2.5 | 0.0064 |
| 48 | 92 | EVA | (2) | 8 | 0.25 | 2.5 | 1.02 |
| 49 | 90 | EVA | (2) | 10 | 0.25 | 2.5 | 1.28 |
| 50 | 70 | EVA | (2) | 30 | 0.25 | 2.5 | 3.84 |
| 51 | 50 | EVA | (2) | 50 | 0.25 | 2.5 | 6.40 |
| 52 | 99.5 | EVA | (15) | 0.5 | 0.25 | 2.5 | 0.049 |
| 53 | 98 | EVA | (15) | 2 | 0.25 | 2.5 | 0.194 |
| 54 | 95 | EVA | (15) | 5 | 0.25 | 2.5 | 0.486 |
| 55 | 92 | EVA | (15) | 8 | 0.25 | 2.5 | 0.778 |
| 56 | 90 | EVA | (15) | 10 | 0.25 | 2.5 | 0.972 |
| 57 | 70 | EVA | (15) | 80 | 0.25 | 2.5 | 2.92 |
| 58 | 50 | EVA | (15) | 50 | 0.25 | 2.5 | 4.86 |
| 59 | 55 | EVA | (15) | 45 | 0.25 | 2.5 | 9.206 |
| 60 | 40 | EVA | (5) | 60 | 0.25 | 2.5 | 12.279 |
| 61 | 15 | EVA | (5) | 85 | 0.25 | 2.5 | 17.395 |
| 62 | 99.9 | EEA | (6) | 0.1 | 0.25 | 2.5 | 0.008 |
| 63 | 98 | EEA | (6) | 2 | 0.25 | 2.5 | 0.178 |
| 64 | 99.8 | EEA | (6) | 0.2 | 0.25 | 2.5 | 0.017 |
| 65 | 90 | EEA | (6) | 10 | 0.25 | 2.5 | 0.867 |
| 66 | 80 | EEA | (6) | 20 | 0.25 | 2.5 | 1.733 |
| 67 | 70 | EEA | (6) | 30 | 0.25 | 2.5 | 2.599 |
| 68 | 50 | EEA | (6) | 50 | 0.25 | 2.5 | 4.833 |
| 69 | 99.5 | EEA | (2.5) | 0.5 | 0.25 | 2.5 | 0.007 |
| 70 | 98 | EEA | (2.5) | 2 | 0.25 | 2.5 | 0.029 |
| 71 | 95 | EEA | (2.5) | 5 | 0.25 | 2.5 | 0.072 |
| 72 | 90 | EEA | (2.5) | 10 | 0.25 | 2.5 | 0.144 |
| 73 | 80 | EEA | (2.5) | 20 | 0.25 | 2.5 | 0.289 |
| 74 | 70 | EEA | (2.5) | 30 | 0.25 | 2.5 | 0.433 |
| 75 | 50 | EEA | (2.5) | 50 | 0.25 | 2.5 | 0.722 |
| 76 | 99.5 | EMA | (2.5) | 0.05 | 0.25 | 2.5 | 0.006 |
| 77 | 98 | EMA | (2.5) | 2 | 0.25 | 2.5 | 0.23 |
| 78 | 95 | EMA | (2.5) | 5 | 0.25 | 2.5 | 0.578 |
| 79 | 90 | EMA | (2.5) | 10 | 0.25 | 2.5 | 1.145 |
| 80 | 80 | EMA | (2.5) | 20 | 0.25 | 2.5 | 2.29 |
| 81 | 70 | EMA | (2.5) | 30 | 0.25 | 2.5 | 3.435 |
| 82 | 50 | EMA | (2.5) | 50 | 0.25 | 2.5 | 5.725 |
| 83 | 99.5 | EMA | (2.5) | 0.5 | 0.25 | 2.5 | 0.017 |
| 84 | 98 | EMA | (3) | 2 | 0.25 | 2.5 | 0.069 |
| 85 | 95 | EMA | (3) | 5 | 0.25 | 2.5 | 0.172 |
| 86 | 90 | EMA | (3) | 10 | 0.25 | 2.5 | 0.344 |
| 87 | 80 | EMA | (3) | 20 | 0.25 | 2.5 | 0.687 |
| 88 | 70 | EMA | (3) | 30 | 0.25 | 2.5 | 1.0305 |
| 89 | 50 | EMA | (3) | 50 | 0.25 | 2.5 | 1.717 |

(Note)
[5]Ester group content included in the mixture of polyethylene and ethylene copolymer having ester groups (% by weight).

Each sheet sample was 1 mm thick, 100 mm wide and 100 mm long. The voltage used for the test was 12 KV, 6 KV or 3 KV, at 50 Hz AC. The aged time was 10,000 hours.

TABLE 8

Result of electrical ageing test under water for blend sample composed of ethylene copolymer containing ester groups and polyethylene.

| Sample No. | Number of Water Trees Generated (number/cm$^3$) | | |
|---|---|---|---|
| | 3 KV | 6 KV | 12 KV |
| 1 | $1.0 \times 10^4$–$1.5 \times 10^4$ | $1.0 \times 10^5$–$1.4 \times 10^5$ | $1 \times 10^7$–$2 \times 10^7$ |
| 45 | 0.9 | 7.8 | 93 |
| 46 | 0.85 | 9.0 | 90 |
| 47 | $1.2 \times 10^3$ | $3.9 \times 10^3$ | $7.9 \times 10^4$ |
| 48 | 0.85 | 7.2 | 68 |
| 49 | 0.8 | 8.2 | 66 |
| 50 | 0.9 | 8.1 | 53 |
| 51 | 0 | 3.8 | 62 |
| 52 | 0.9 | 9.0 | 98 |
| 53 | 0.85 | 7.8 | 92 |
| 54 | 0.8 | 7.2 | 86 |
| 55 | 0.7 | 8.1 | 80 |
| 56 | 0.7 | 7.2 | 75 |
| 57 | 0.69 | 7.3 | 98 |
| 58 | 0.73 | 7.1 | 92 |
| 59 | 0 | 3.3 | 68 |
| 60 | 0 | 3.1 | 65 |
| 61 | 0 | 3.0 | 63 |
| 62 | $1.9 \times 10$ | $1.5 \times 10^2$ | $1.8 \times 10^3$ |
| 63 | 0.88 | 8.2 | 95 |
| 64 | 0.78 | 7.9 | 88 |
| 65 | 0.89 | 8.6 | 88 |
| 66 | 0.85 | 7.8 | 93 |
| 67 | 0.79 | 6.8 | 89 |
| 68 | 0.91 | 7.1 | 86 |
| 69 | $1.4 \times 10^2$ | $1.0 \times 10^3$ | $8.3 \times 10^3$ |

TABLE 8-continued

Result of electrical ageing test under water for blend sample composed of ethylene copolymer containing ester groups and polyethylene.

| Sample No. | Number of Water Trees Generated (number/cm³) | | |
|---|---|---|---|
| | 3 KV | 6 KV | 12 KV |
| 70 | 0.85 | 7.8 | 89 |
| 71 | 0.91 | 7.1 | 84 |
| 72 | 0.88 | 8.9 | 91 |
| 73 | 0.86 | 8.1 | 88 |
| 74 | 0.78 | 8.3 | 72 |
| 75 | 0.69 | 7.8 | 83 |
| 76 | $1.2 \times 10^3$ | $4.0 \times 10^3$ | $7.9 \times 10^4$ |
| 77 | 0.81 | 7.8 | 88 |
| 78 | 0.74 | 7.1 | 77 |
| 79 | 0.76 | 7.0 | 71 |
| 80 | 0.71 | 6.8 | 70 |
| 81 | 0.68 | 6.5 | 68 |
| 82 | 0.68 | 6.8 | 61 |
| 83 | 0.88 | 7.8 | 77 |
| 84 | 0.81 | 7.5 | 68 |
| 85 | 0.75 | 6.8 | 65 |
| 86 | 0.87 | 8.8 | 78 |
| 87 | 0.81 | 8.1 | 80 |
| 88 | 0.76 | 7.8 | 84 |
| 89 | 0.81 | 7.3 | 75 |

As can be seen from Table 8, in Samples 45, 46, 48–61, 63–68, 70, 75 and 77–89 which are blends composed of ethylene copolymer and polyethylene and containing 0.01% by weight or more of the ester groups, the number of water trees generated is remarkably reduced in comparison with Sample 1 which is composed of only polyethylene and Samples 47 containing less than 0.01% by weight ester group content.

The present inventors have also found that, in blends of EVA and polyethylene in Example 4, there are critical amounts at which especially good effects are exhibited. Namely, critical amounts exist for: (1) variation of Vicat softening point with the ester group content, and (2) variation of stripping strength with the EVA content.

Figure 4:
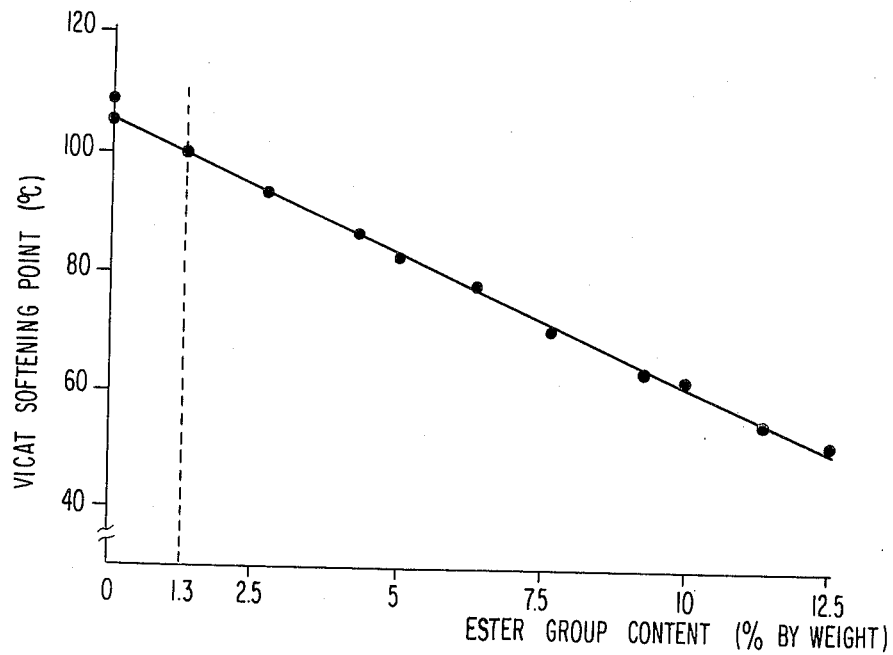
FIG. 4 is a graph showing the relationship between ester group content and Vicat softening point.

Concerning (1), as shown in FIG. 4, if the ester group content is less than 1.3% by weight, the Vicat softening point reaches 100° C. or higher. Generally, heat is generated in electric cables during their operation. The related maximum temperature of the cable is about 90° C. The maximum temperature required on the cable insulation materials is the value which results by multiplying 90° C. by 1.1, the factor of safety (90° C. × 1.1 ≅ 100° C.). Accordingly, materials composing the insulation layer of these electric cables must have a softening point of 100° C. or higher. In cases that mixtures composed of EVA and polyethylene are used for the above described insulation layer, compositions having 100° C. or more of the Vicat softening point are required, too. Thus, compositions containing less than 1.3% by weight of the ester group content satisfy the above described requirement.

Figure 5:
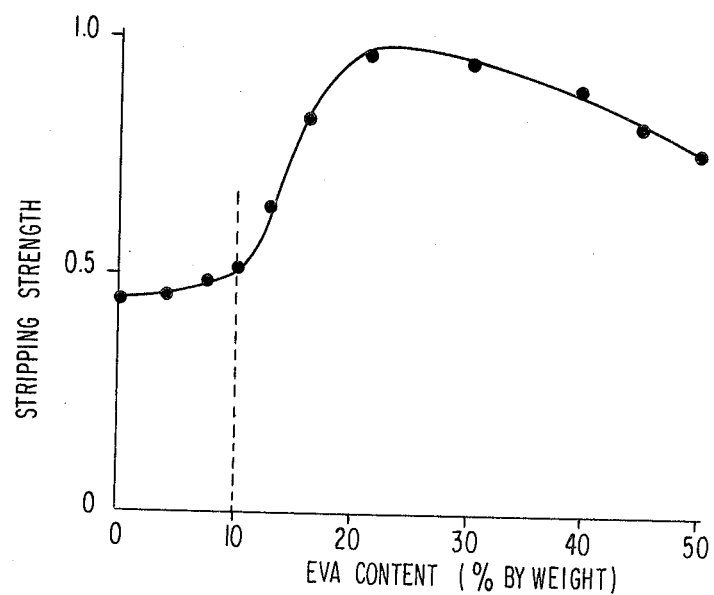
FIG. 5 is a graph showing the relationship between EVA content and stripping strength.

Concerning (2), as shown in FIG. 5, the stripping strength is remarkably reduced when the EVA content is lower than 10% by weight. Stripping strength described here means that which results upon stripping a film of a mixture of EVA and polyethylene from another article.

In general, polyethylene insulating electric cables are produced by means of an extruder. That is, they are produced by a method which comprises charging pellets of a polyolefin mixture into a hopper of the extruder, heating, fusing and blending the polyethylene mixture in a cylinder of the extruder by means of a screw, and extruding it around running conductive wires at a cross-head part to cover them. In this case, a part of the fused polyethylene mixture adheres to the inside of the cylinder, the surface of the screw and the inside of the crosshead. As a result, after conclusion of the extrusion coating operation, it is necessary to remove the polyethylene mixture remaining in the extruder by stripping it from the surface of the screw and the inside of the crosshead part. If the ratio of EVA to polyethylene is less than 10% by weight, the stripping strength is low and the described removal can be carried out rapidly. However, if it is 10% by weight or more, the stripping strength nearly doubles and the operation is difficult. That the stripping strength is low is also profitable from the standpoint that an outer semiconductive layer provided on the insulation layer of the electric cable is stripped in order to carry out terminal processing of the electric cable.

EXAMPLE 5

Sheet samples having the composition shown in Table 9, wherein polyethylene was grafted with ester type polyfunctional monomers were produced, which were examined by the electrical ageing test under water.

TABLE 9

| | Formulation | | | | |
|---|---|---|---|---|---|
| Sample No. | Polyethylene (parts) | Ester Type Polyfunctional Monomer (parts) | NOCRAC 300 (parts) | Dicumyl Peroxide (parts) | Ester[6] Group Content (wt. %) |
| 1 | 100 | No addition | 0.25 | 2.0 | 0 |
| 90 | 100 | Methyoxypolyethylene glycol #400 methacrylate 0.1 | 0.25 | 2.0 | 0.008 |
| 91 | 100 | Methoxypolyethylene glycol #400 methacrylate 0.5 | 0.25 | 2.0 | 0.043 |
| 92 | 100 | Polyethylene glycol #600 dimethacrylate** 1.0 | 0.25 | 1.0 | 0.116 |
| 93 | 100 | Methoxypolyethylene glycol #400 methacrylate 2.0 | 0.25 | 1.0 | 0.172 |
| 94 | 100 | Polyethylene glycol #600 dimethacrylate** | 0.25 | 1.0 | 0.231 |

TABLE 9-continued

| Sample No. | Polyethylene (parts) | Ester Type Polyfunctional Monomer (parts) | NOCRAC 300 (parts) | Dicumyl Peroxide (parts) | Ester[6] Group Content (wt. %) |
|---|---|---|---|---|---|
| 95 | 100 | Neopentyl glycol dimethacrylate 2.0 | 0.25 | 1.0 | 0.710 |
| 96 | 100 | Trimethylolpropane trimethacrylate 2.0 | 0.25 | 1.0 | 0.756 |
| 97 | 100 | Polyethylene glycol #400 diacrylate* 2.0 | 0.25 | 1.0 | 0.327 |
| 98 | 100 | Tetramethylolmethane tetramethacrylate 2.0 | 0.25 | 1.0 | 0.835 |
| 99 | 100 | Triallyl trimellitate 2.0 | 0.25 | 1.0 | 0.775 |
| 100 | 100 | Polypropylene glycol #400 dimethacrylate 2.0 | 0.25 | 1.0 | 0.252 |
| 101 | 100 | Triallyl trimellitate 1.0 | 0.25 | 2.0 | 0.888 |
| 102 | 100 | Neopentyl glycol dimethacrylate 1.0 | 0.25 | 2.0 | 0.355 |
| 103 | 100 | Polypropylene glycol #400 dimethacrylate 1.0 | 0.25 | 2.0 | 0.126 |

(Note)
[6]Ester group content in polyethylene grafted with the ester type polyfunctional monomer (% by weight).
*having 18 carbon atoms in the polyethylene glycol.

Each sheet samples was 1 mm thick, 100 mm wide and 100 mm long. The voltage used for the test was 12 KV, 6 KV and 3 KV at 50 Hz AC. The aged time was 10,000 hours.

The results of the electrical ageing test under water are shown in Table 10.

TABLE 10

Result of electrical ageing test under water for samples comprising polyethylene grafted with ester type polyfunctional monomer.

| Sample No. | Number of Water Trees Generated (number/cm³) | | |
|---|---|---|---|
| | 3 KV | 6 KV | 12 KV |
| 1 | $1.0 \times 10^4$–$1.5 \times 10^4$ | $1.0 \times 10^5$–$1.4 \times 10^5$ | $1 \times 10^7$–$2 \times 10^7$ |
| 90 | $1.9 \times 10$ | $1.5 \times 10^2$ | $1.7 \times 10^3$ |
| 91 | 0.91 | 8.1 | 96 |
| 92 | 0.88 | 7.8 | 88 |
| 93 | 0.98 | 7.8 | 98 |
| 94 | 0.91 | 8.2 | 88 |
| 95 | 0.86 | 9.3 | 91 |
| 96 | 0.85 | 8.1 | 83 |
| 97 | 0.81 | 6.3 | 81 |
| 98 | 0.70 | 7.0 | 78 |
| 99 | 0.75 | 6.8 | 70 |
| 100 | 0.73 | 6.0 | 73 |
| 101 | 0.93 | 8.3 | 81 |
| 102 | 0.95 | 7.0 | 90 |
| 103 | 0.80 | 6.3 | 80 |

As can be understood from Table 10, in Samples 91–103 which comprise polyethylene grafted with ester type polyfunctional monomers containing 0.01% by weight or more of the ester group content, the number of water trees generated is remarkably reduced in comparison to Sample 1 which is composed only of polyethylene and Sample 90 which contains less than 0.01% by weight ester group content.

Figure 1:
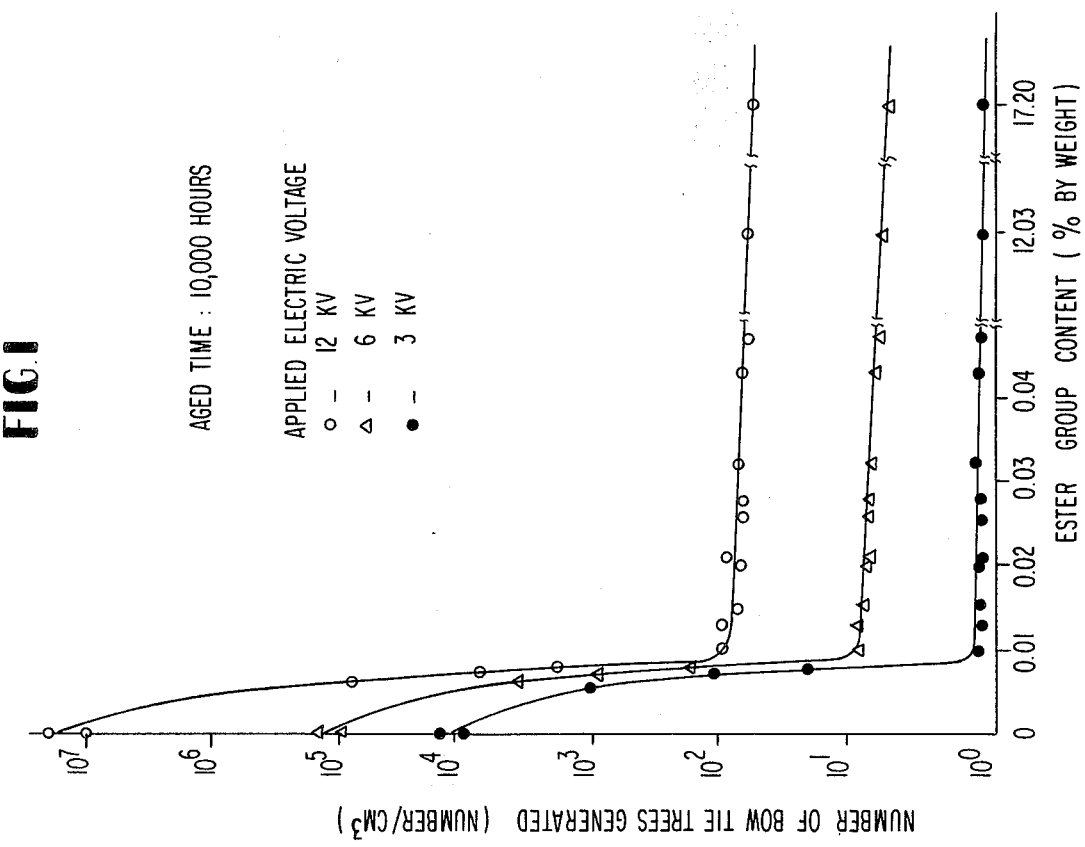
FIG. 1 is a graph showing the relationship between the ester group content and number of bow tie trees generated, which shows the effect of suppressing the bow tie tree by introduction of ester groups in accordance with the present invention.

FIG. 1 shows the number of bow tie trees generated with each sample shown in the above described Examples to the ester group content. It is understood from FIG. 1 that, when the ester group content is 0.01% by weight or more, a remarkable effect of suppressing the bow tie trees by the introduction of ester groups is observed. On the other hand, FIG. 2 shows the tensile strength at high temperatures of samples containing an ester group content. It is understood from FIG. 2 that, when the ester group content is 13.0% by weight or more, the tensile strength at a high temperature rapidly decreases.

From the above described two facts, it is believed that the optimum range of the ester group content is 0.01–13.0% by weight considering all factors including suppression of bow tie trees.

As can be understood from the above described Examples, generation of water trees can be remarkably prevented using in the polyolefin compositions of the present invention, namely, polyolefin compositions comprising polyolefin to which an ester or metal salt of a fatty acid was added or a polyolefin impregnated with an ester or metal salt of a fatty acid, polyolefin compositions comprising ethylene copolymer containing a desired amount of ester group, polyolefin compositions comprising a blend of an ethylene copolymer containing ester groups and polyolefin and polyolefin compositions comprising polyolefins grafted with ester type polyfunctional monomers.

The reason for this can be theoretically understood as follows. Namely, as a result of the ester groups introduced into the polyolefin, moisture does not condense or liquefy under application of an electric field because wetting between the polymer chains and water is good. Consequently, mechanical strains of polymer caused by condensation of moisture do not occur and generation of water trees (bow tie trees) can be prevented.

While the invention has been described in detail and with reference to specific embodiments thereof, it will be apparent to one skilled in the art that various changes and modifications can be made therein without departing from the spirit and scope thereof.

What is claimed is:

1. A polyolefin insulated electric cable exhibiting the effect of suppressed water tree formation which comprises an electrical insulation layer provided around a conductor, said insulation layer comprising a polyolefin grafted with an ester type polyfunctional monomer, which polyolefin contains 0.01 to 0.888% by weight of ester groups.

2. A polyolefin insulated electric cable exhibiting the effect of suppressed water tree formation which comprises an electrical insulation layer provided around a conductor, said insulation layer comprising a polyolefin to which a solid ester of fatty acid is added, which polyolefin contains 0.01 to 0.029% by weight of ester groups.

3. A polyolefin insulated electric cable exhibiting the effect of suppressed water tree formation which comprises an electrical insulation layer provided around a conductor, said insulation layer comprising a polyolefin to which a water insoluble or slightly soluble metal salt of a fatty acid is added, which polyolefin contains 0.01 to 0.029% by weight of ester groups.

4. The cable of claims 1, 2 or 3 wherein said insulation layer contains an organic peroxide cross-linking agent.

5. A connector for an electric cable comprising a sleeve connecting the conductors of a cable and an insulating layer covering said the connecting sleeve and arranged around the insulating layer of the cable, said insulating layer covering said connecting sleeve being a polyolefin grafted with an ester type polyfunctional monomer, which polyolefin contains 0.01 to 0.888% by weight of ester groups.

6. A connector for an electric cable comprising a sleeve connecting the conductors of a cable and an insulating layer covering said connecting sleeve and arranged around the insulating layer of the cable, said insulating layer covering said connecting sleeve being a polyolefin to which a solid ester of fatty acid is added, which polyolefin contains 0.01 to 0.029% by weight of ester groups.

7. A connector for an electric cable comprising a sleeve connecting the conductors of a cable and an insulating layer covering said connecting sleeve and arranged around the insulating layer of the cable, said insulating layer covering said connecting sleeve being a polyolefin to which water insoluble or slightly soluble metal salt of fatty acid is added, which polyolefin contains 0.01 to 0.029% by weight of ester groups.

8. An electric cable terminal comprising a terminal connected to the conductor of a cable and an insulating layer for the terminal arranged around the terminal and insulating layer of the cable, said insulating layer for the terminal being a polyolefin grafted with an ester type polyfunctional monomer, which polyolefin contains 0.01 to 0.888% by weight of ester groups.

9. An electric cable terminal comprising a terminal connected to the conductor of a cable and an insulating layer for the terminal arranged around the terminal and insulating layer of the cable, said insulating layer for the terminal being a polyolefin to which a solid ester of fatty acid is added, which polyolefin contains 0.01 to 0.029% by weight of ester groups.

10. An electric cable terminal comprising a terminal connected to the conductor of a cable and an insulating layer for the terminal arranged around the terminal and insulating layer of the cable, said insulating layer for the terminal being a polyolefin to which a water insoluble or slightly soluble metal salt of a fatty acid is added, which polyolefin contains 0.01 to 0.029% by weight of ester groups.

* * * * *